US008123939B2

(12) United States Patent
Chu et al.

(10) Patent No.: US 8,123,939 B2
(45) Date of Patent: Feb. 28, 2012

(54) COLLECTION CAN FOR PRECIPITATED POWDER SUBSTANCE AND THE USE THEREOF

(75) Inventors: Hsin-Chi Chu, Taoyuan County (TW); Chin-Chun Chu Ko, Taoyuan County (TW); Tain-Shi Zen, Taoyuan County (TW); Shang-Yao Feng, Taoyuan County (TW); Tsu-Han Cheng, Taoyuan County (TW); Chi-Wen Huang, Taoyuan County (TW)

(73) Assignee: Institute of Nuclear Energy Research, Tiaan Village, Longtau, Taoyuan (TW)

( * ) Notice: Subject to any disclaimer, the term of this patent is extended or adjusted under 35 U.S.C. 154(b) by 127 days.

(21) Appl. No.: 12/636,799

(22) Filed: Dec. 14, 2009

(65) Prior Publication Data

US 2011/0139700 A1 Jun. 16, 2011

(51) Int. Cl.

*B01D 35/02* (2006.01)
*B01D 35/28* (2006.01)
*B01D 29/085* (2006.01)
*B01D 29/11* (2006.01)

(52) U.S. Cl. ........ 210/232; 210/239; 210/248; 210/484; 210/911; 373/313; 588/20

(58) Field of Classification Search ........................ None
See application file for complete search history.

(56) References Cited

U.S. PATENT DOCUMENTS 708,582 A * 9/1902 Davis ........................... 210/148
796,122 A * 8/1905 Higgins ........................ 210/239
834,366 A * 10/1906 Potter ........................... 210/239
1,421,622 A * 7/1922 Van Ness ...................... 210/482
1,653,214 A * 12/1927 Kempter ....................... 210/482
1,666,070 A * 4/1928 Page .............................. 99/285
1,905,350 A * 4/1933 Page .............................. 99/298
2,225,984 A * 12/1940 Erekson ...................... 73/61.71
2,318,424 A * 5/1943 Sattler ............................ 137/38
2,707,611 A * 5/1955 Fricke ........................... 248/313
3,339,743 A * 9/1967 Bealle ........................... 210/256
3,448,859 A * 6/1969 Barker et al. ................. 210/770
3,658,179 A * 4/1972 Baumann et al. ................. 588/3
3,747,767 A * 7/1973 Hankammer ................. 210/282
4,021,354 A * 5/1977 Lyon ............................. 210/477
4,058,479 A * 11/1977 White et al. .................... 588/16
4,231,873 A * 11/1980 Swigger ................... 210/170.05
4,268,392 A * 5/1981 Hayes ........................... 210/238
4,603,432 A * 7/1986 Marino ............................. 383/2
4,650,086 A * 3/1987 Morrison, Jr. ................ 220/606
4,689,147 A * 8/1987 Leoncavallo et al. ......... 210/232
4,854,058 A * 8/1989 Sloan et al. ...................... 37/323
4,959,146 A * 9/1990 Kristan ......................... 210/237
(Continued)

*Primary Examiner* — Robert James Popovics

(57) ABSTRACT

A collection process for precipitated powder substance is mainly for storing toxic or highly radioactive powder or dust in air and involves collection operation in water or other liquid to collect powder insoluble to the liquid and heavier than the liquid. To be suitable for underwater operation, a powder precipitation bag is provided with an innovative powder collection can at its bottom. New powder collection can has a mesh filter in its bottom and two-stage structure. After completion of powder collection, the collection can is pulled up from the water and dried to reduce powder volume and form powder lumps. Then, the top half is removed, so the collection can is fully filled with powder lumps. The newly designed powder can increases storage efficiency and reduces waste of space by accommodating more powder lumps than traditional powder can. With the same total amount of powder, the new powder can enables fewer number of storage cans. The cover for the new can improves safety for further transportation and storage.

1 Claim, 5 Drawing Sheets

U.S. PATENT DOCUMENTS

| | | | | |
|---|---|---|---|---|
| 5,308,482 | A * | 5/1994 | Mead | 210/207 |
| 5,646,971 | A * | 7/1997 | Howe | 376/272 |
| 6,040,491 | A * | 3/2000 | Sjowall | 588/16 |
| 6,161,701 | A * | 12/2000 | Biesinger | 210/521 |
| 6,219,399 | B1 * | 4/2001 | Naruse et al. | 376/245 |
| 7,776,223 | B2 * | 8/2010 | Chang et al. | 210/747.4 |
| 2008/0078726 | A1 * | 4/2008 | Pancaldi et al. | 210/770 |
| 2009/0314715 | A1 * | 12/2009 | Conwell | 210/650 |
| 2010/0012594 | A1 * | 1/2010 | Chang et al. | 210/747 |
| 2011/0024364 | A1 * | 2/2011 | Chang et al. | 210/745 |
| 2011/0114563 | A1 * | 5/2011 | Kane et al. | 210/662 |
| 2011/0139700 | A1 * | 6/2011 | Chu et al. | 210/248 |

* cited by examiner

COLLECTION CAN FOR PRECIPITATED POWDER SUBSTANCE AND THE USE THEREOF

BACKGROUND OF THE INVENTION

1. Field of the Invention

The present invention is related to a collection can and the use thereof for precipitated powder substance that is toxic or highly radioactively polluted and dispersed in liquid.

2. Description of the Prior Art

In manufacturing or nuclear energy industry, the manufacturing process and waste treatment process could produce toxic or highly radioactive powder or dust. There will be concerns about health risk and environment pollution if the substances are stored in a place for a long period of time and exposed to atmosphere. They need to be stored in water or some kind of liquid to minimize their hazard to the environment. When cleaning or transferring is conducted, it is necessary to remove the hazardous powder in the bottom. The further treatment of powder also poses additional restriction and difficulty. Therefore, powder collection needs to be carried out in the liquid. Transportation and operation of the removed powder requires extra caution to prevent workers from toxic hazard or accumulation of overdosed radiation.

Since toxic or highly radioactive powder or dust is extremely hazardous, the highly radioactive powder needs to be stored in water or some kind of liquid to prevent workers from inhaling toxic powder or accumulation of overdosed radiation. Powder collection needs to be in the water and should not be in the atmosphere by operators pouring powder into container.

In the process of powder collection in the liquid, the powder collection can contains powder slurry with a large amount of water. When the powder collection can is lifted from water, the bottom filer removes water to dry the powder, and the powder slurry in the can becomes smaller in volume and precipitates to form power lumps. Usually, if the dried powder lumps take half or less of the container, the powder can space is not efficiently utilized and that will pose difficulty in transportation and storage. It is necessary to seek improvement. In view of the drawbacks with traditional underwater powder collection, the inventor has found improvement in the present invention.

SUMMARY OF THE INVENTION

The primary objective for the present invention is to provide a collection can to precipitate powder and its application method, which needs to be operated in water or other liquid to collect powder insoluble to the liquid and heavier than the liquid. To be suitable for underwater operation, a powder precipitation bag is provided with an innovative powder collection can at its bottom. New powder collection can is designed to accommodate more powder slurry than the traditional powder collection can and has increased capacity. For the same amount of powder to collect, it will be fewer cans and less storage volume if the new powder collection can is used. This will also facilitate further transportation and storage. The method is very simple without much expense to reduce operation cost. The hazards of toxic and radioactive substance to workers will be within control.

To achieve the above objectives, the technical approaches include: setting a powder precipitation bag that is separate and isolated from tank water, connecting at the bottom of the precipitation bag an innovative two-stage powder collection can that uses pump to withdraw power at tank bottom into a precipitation bag and allows the powder in the precipitation bag to precipitate for a while and concentrate in the powder collection can below and draws tank water from the precipitation bag out of the precipitation bag. After repeating the powder precipitation process and assuring the powder collection can is fully filled with powder slurry, the powder collection can is pulled up and through barrier shield the powder collection can is moved out of water. The design of the innovative powder collection can comprises a powder collection can main, a removable powder collection can and a powder collection can. At the bottom of the main body of the collection can, there is a mesh filter to filter out water from powder slurry. The design concept for the new powder collection can comprises two stages; including a top half with removable collection can and a bottom half with powder collection can main body and the cover. The connection mechanism between the removable collection can as the top half and the main body of powder collection can is turn-and-lock type. The connection mechanism between the cover of the powder collection can and the powder collection can main body is also turn-and-lock type. It is designed for fast disassembly.

The present invention can be applied to collection operation for powder slurry with a large amount of water content. When it is removed from water and dried, the powder volume is greatly reduced and the powder precipitates to the main body of the powder collection can in the bottom half to become powder lumps. Thus, after removal of the empty can from the top half, the main body of the powder can in the bottom half is filled with powder lumps and the storage efficiency is significantly improved. The use of newly designed two-stage powder collection can enables filling with more quantity of powder lumps and increasing efficiency of container space utilization. With the same total amount of powder, the use of new powder collection can allows smaller number of containers. The new powder collection can also comes with a cover to increase safety of further transportation and storage management.

DETAILED DESCRIPTION OF THE INVENTION

Figure 1:
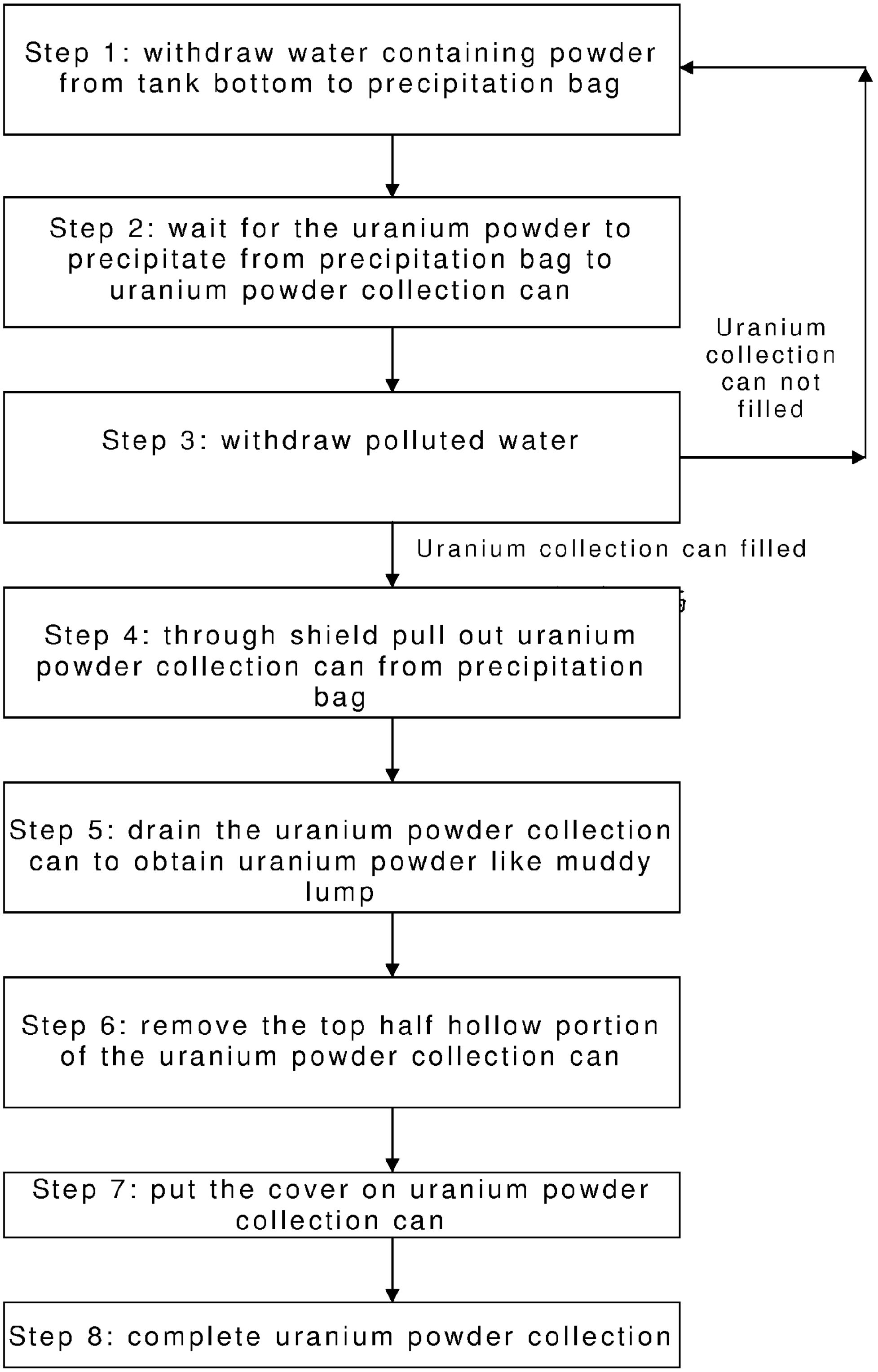
FIG. 1 is the process flow diagram for the present invention.
Figure 2:
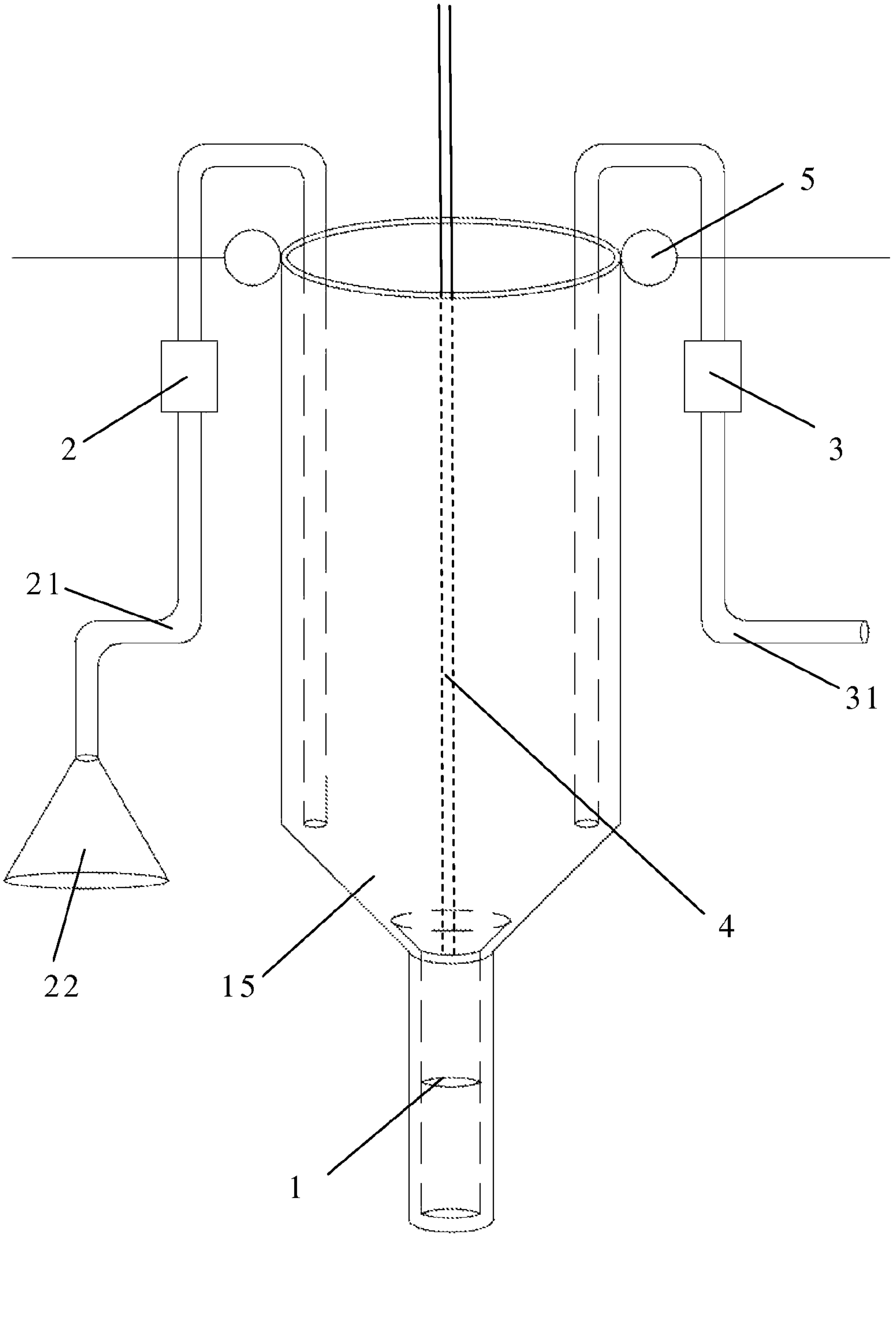
FIG. 2 is the illustration of the assembly of the present invention.
Figure 3:
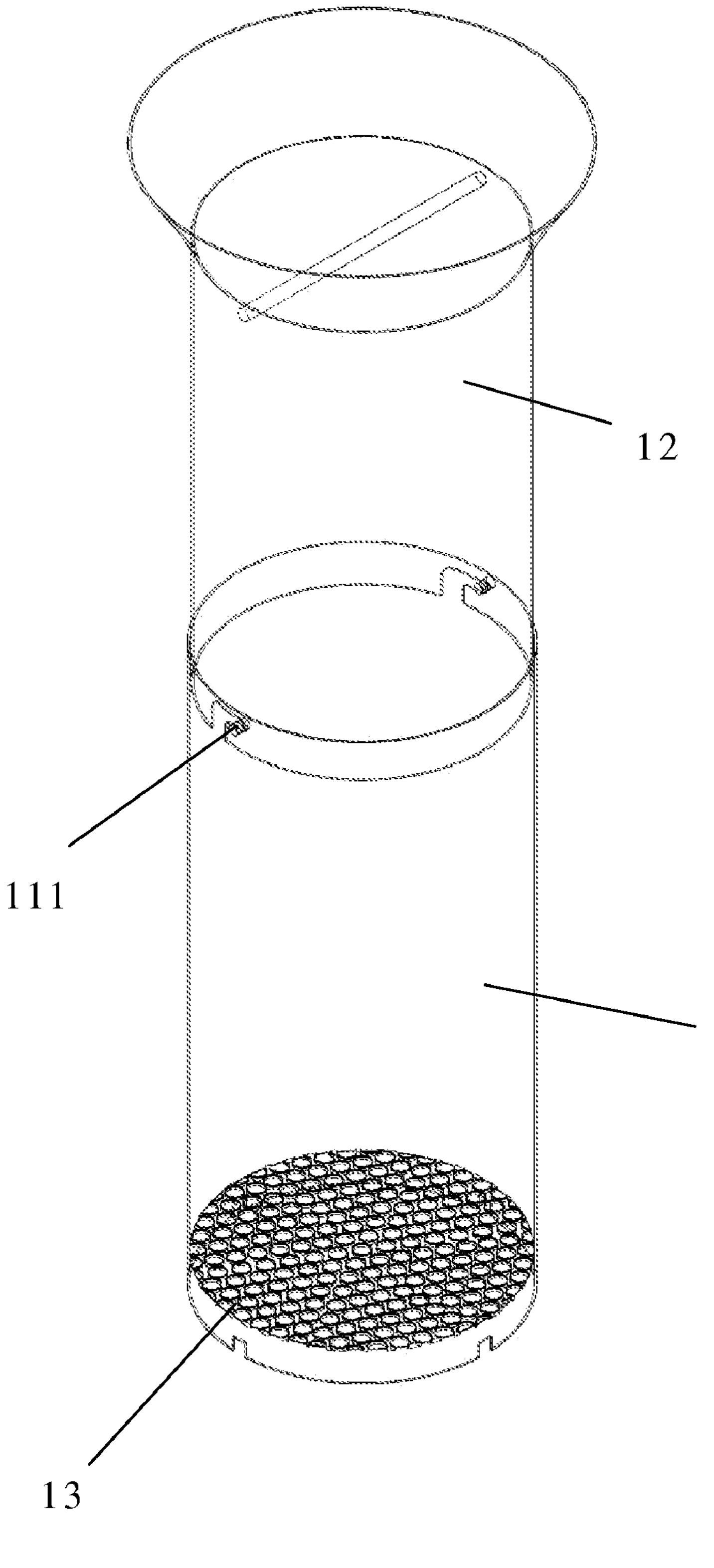
FIG. 3 is the assembly diagram of the main body of the powder collection can and the top half for the present invention.
Figure 4:
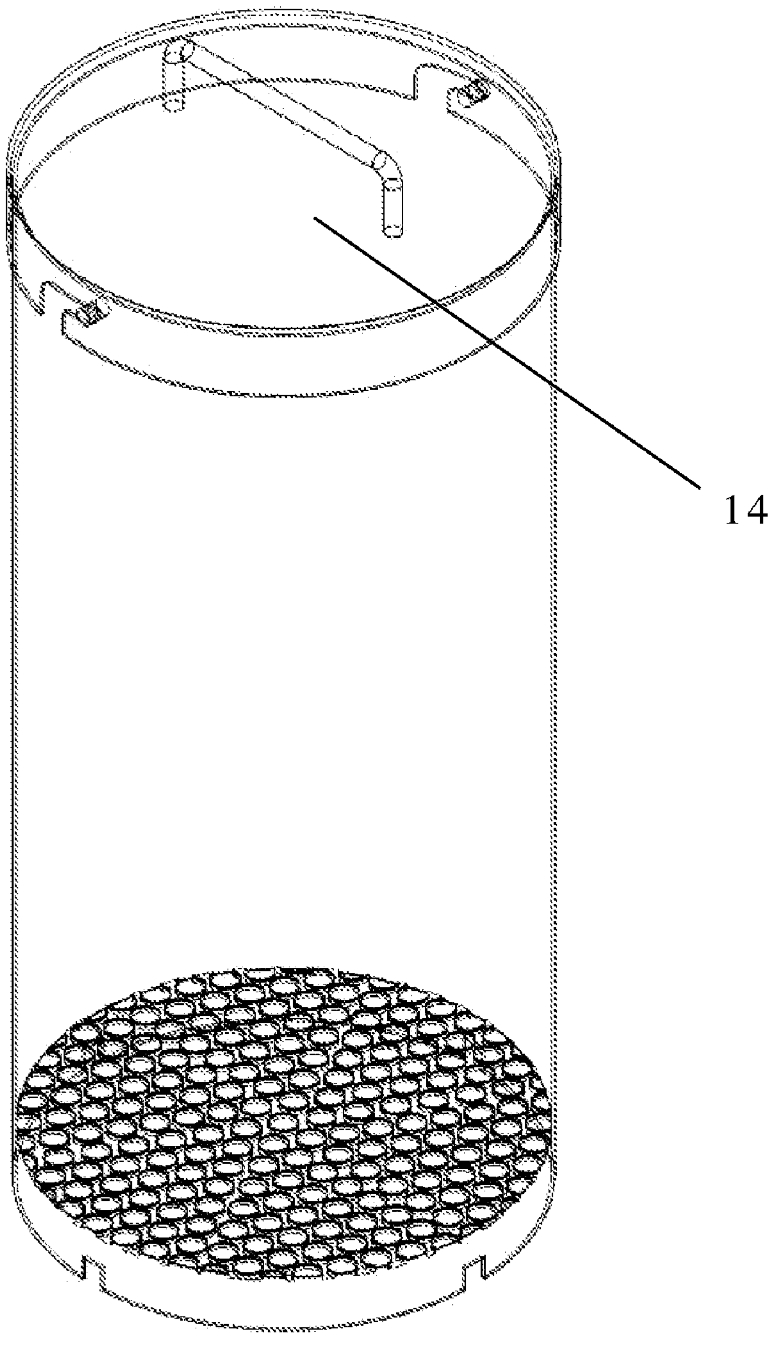
FIG. 4 is the assembly diagram of the main body of the powder collection can and the cover for the present invention.
Figure 5:
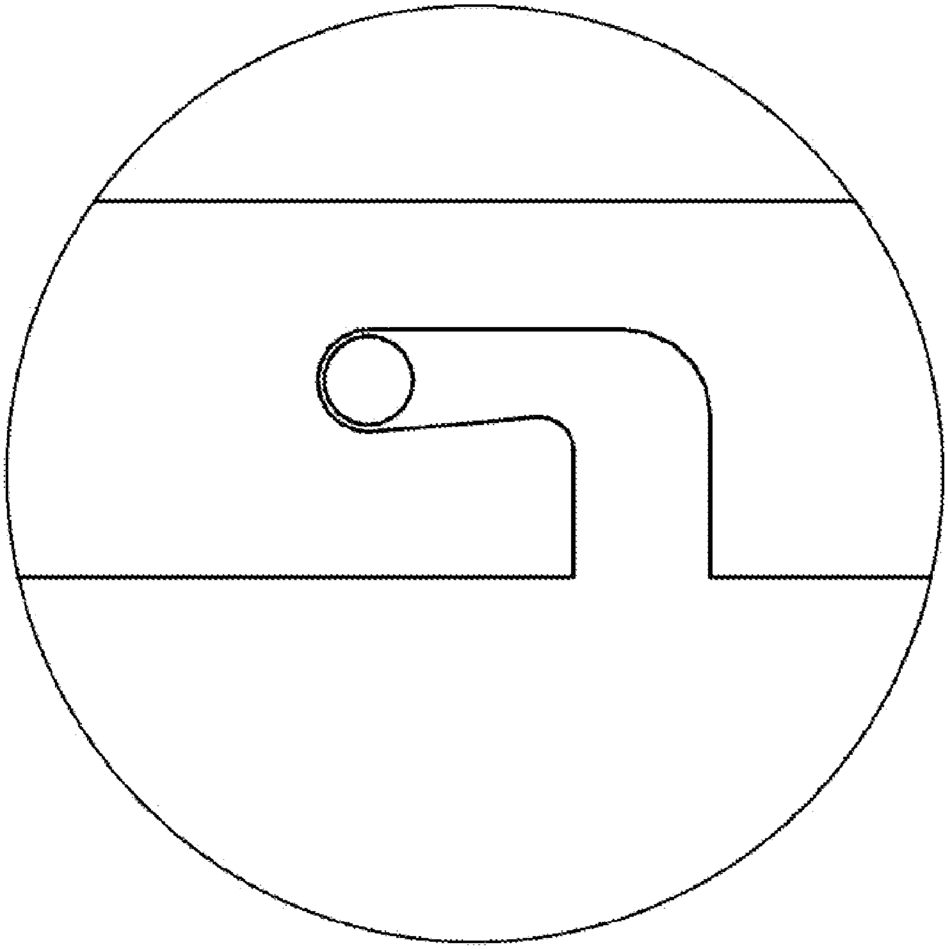
FIG. 5 is the illustration for fast disassembly and assembly for the powder collection can for the present invention.

A preferred embodiment for the present invention is provided here. FIG. 1 is the process flow diagram for the present invention. From FIG. 2 for the assembly diagram of the present invention, it can be seen that the procedures for the present invention at least consist of: step 1 "transferring water containing powder from tank bottom to precipitation bag", step 2 "allowing the powder in the precipitation bag to precipitate to powder collection can, step 3 "withdrawing polluted water from the precipitation bag to the tank, step 4 "through barrier shield, lifting up powder collection can from the precipitation bag, step 5 "allowing dripping and drying for the powder in collection can to form powder lumps, step 6 "removing empty top half of the powder collection can, step 7 "putting the cover on the powder collection can", after which the entire powder collection process is completed. Step 1 "transferring water containing powder from tank bottom to precipitation bag" refers to utilizing underwater monitoring equipment and manually attaching the end of a long stick to the suction-end soft tube (21) of the polluted water pump (2) and re-connecting it to the intake (22), and moving the suction tube around the tank bottom to suck the powder. At the same time, the polluted water pump (2) transfers the powder containing water to the powder precipitation bag (15). The top of the powder precipitation bag (15) is higher than water level to separate water inside and outside the precipitation bag. Step 2 "allowing the powder in the precipitation bag to precipitate to powder collection can" refers to withdrawing tank water into the powder precipitation bag (15) for full capacity and simultaneously shutting off the polluted water pump (2) and allowing the powder in the powder precipitation bag (15) completely precipitate into the powder collection can (1) in approximately three days. Step 3 "withdrawing polluted water from the precipitation bag to the tank" refers to "withdrawing polluted water from the powder precipitation bag (15) by a submersible water pump (3) to outside the powder precipitation bag (15) and continuing filling powder slurry until powder collection can (1) is filled up. Step 4 "through barrier shield, lifting up powder collection can from the precipitation bag" refers to utilizing underwater monitoring equipment to assure full capacity of powder collection can (1) is reached and through barrier shield using steel cable 4 to lift up the powder collection can 1 from the powder precipitation bag (15) out of water. Step 5 "allowing dripping and drying for the powder in collection can to form powder lumps" refers to reducing powder slurry volume to half by dripping water inside the powder collection can (1) through the bottom mesh filter (13) and forming powder slurry. Step 6 "removing empty top half of the powder collection can refers to separating the top empty can (12) as the top half of the powder collection can (1) and the main body (11) as the bottom half by fixing the top half of the powder collection can (1) and quickly removing the removable collection can (12). Step 7 "putting the cover on the powder collection can" refers to using tools to put the cover (14) on the powder collection can (1).

In summary, the powder collection can to precipitate powder and the use thereof described in the present invention can indeed achieve simplified operation and increased collection efficiency. It is an invention with novelty and progressiveness. Thus the application for patent is filed accordingly. However, the above description is only for a preferred embodiment of the present invention, those variations, modifications or equivalent substitution based on the technical approaches and scope of the present invention shall all fall into the claims of the patent application.

What is claimed is:

1. An apparatus for collecting and dewatering a powder comprising:

a precipitation bag; and a collection can disposed within said precipitation bag, said collection can comprising:

- a main body including a removable top half part and a bottom half part;
- a turn and lock connection mechanism removably securing said removable top half part and said bottom half part;
- a cover connectable to said bottom half part using a turn and lock connection mechanism to secure said cover to said bottom half part, when said top half part is detached from said bottom half part; and
- a mesh filter at a lower end of said bottom half part;
- wherein, water containing powder is transferred into said precipitation bag, said powder precipitates into said collection can whereafter, said collection can is removed from said precipitation bag, water is permitted to drain from said collection can through said mesh filter, an empty top half part of said collection can is removed from said bottom half part and said can is covered using said cover.

* * * * *